US011459215B2

(12) United States Patent
Wong et al.

(10) Patent No.: US 11,459,215 B2
(45) Date of Patent: Oct. 4, 2022

(54) SAFETY SYSTEM FOR A MACHINE

(71) Applicant: Hong Kong R&D Centre for Logistics and Supply Chain Management Enabling Technologies Limited, Pok Fu Lam (HK)

(72) Inventors: Kwong Yeung Simon Wong, Pok Fu Lam (HK); Chun Wai Lai, Pok Fu Lam (HK); Chi Wai Leung, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 241 days.

(21) Appl. No.: 15/780,661

(22) PCT Filed: Dec. 1, 2015

(86) PCT No.: PCT/CN2015/096097
§ 371 (c)(1),
(2) Date: Jun. 1, 2018

(87) PCT Pub. No.: WO2017/091972
PCT Pub. Date: Jun. 8, 2017

(65) Prior Publication Data
US 2020/0255267 A1    Aug. 13, 2020

(51) Int. Cl.
*B66C 15/06*    (2006.01)
*B60R 1/00*    (2022.01)
*B66C 15/00*    (2006.01)
*B66C 23/88*    (2006.01)
(Continued)

(52) U.S. Cl.
CPC ............ *B66C 15/065* (2013.01); *B60Q 5/005* (2013.01); *B60Q 9/00* (2013.01); *B60R 1/00* (2013.01); *B66C 15/00* (2013.01); *B66C 23/88* (2013.01); *B60R 2300/101* (2013.01); *B60R 2300/107* (2013.01); *B60R 2300/8033* (2013.01)

(58) Field of Classification Search
CPC ....... B66C 15/065; B66C 15/00; B66C 23/88; B66C 15/045; B60Q 5/005; B60Q 9/00; B60R 1/00; B60R 2300/101
See application file for complete search history.

(56) References Cited

U.S. PATENT DOCUMENTS 1,712,650 A * 5/1929 Clark ...................... F21V 21/34
340/471
9,738,494 B2 * 8/2017 Shubel .................... B66C 13/04
(Continued)

FOREIGN PATENT DOCUMENTS

JP    2010241548    10/2010

*Primary Examiner* — Ig T An
(74) *Attorney, Agent, or Firm* — Renner, Kenner, Greive, Bobak, Taylor & Weber (57) ABSTRACT

A safety system for a load carrying machine including: a controller, a location sensing arrangement in electronic communication with the processor, the location sensing arrangement configured to determine a location parameter of a load, a monitoring arrangement, the controller configured to receive the location parameter and determine a projected area of the load and control the monitoring arrangement to focus on the projected area to monitor the projected area.

27 Claims, 8 Drawing Sheets

(51) Int. Cl.
  *B60Q 5/00* (2006.01)
  *B60Q 9/00* (2006.01)

(56) References Cited

U.S. PATENT DOCUMENTS

| | | | |
|---|---|---|---|
| 2010/0044332 A1* | 2/2010 | Cameron | B66C 15/065 |
| | | | 212/278 |
| 2015/0142277 A1* | 5/2015 | Eriksson | B66C 13/48 |
| | | | 701/50 |
| 2015/0144582 A1* | 5/2015 | Ford | B66C 13/46 |
| | | | 212/276 |
| 2015/0161872 A1* | 6/2015 | Beaulieu | B66C 13/40 |
| | | | 340/686.6 |

* cited by examiner

SAFETY SYSTEM FOR A MACHINE

TECHNICAL FIELD

The present invention relates to safety system for a machine, in particular the present invention relates to a safety system for use with a load carrying machine to warn people of hazards associated with the machine.

BACKGROUND

Safety is generally the main concern in the construction, manufacturing, heavy engineering, logistics, shipping, warehousing and other such industries, especially where individuals generally work in close proximity to heavy machinery or vehicles. Safety is of particular importance in industries that involve constantly moving large or heavy loads, often over the heads of workers. Some examples are the shipping industry and construction industry. Cranes or forklifts or other such vehicles or machinery are used in such are used to move large loads over the heads of workers.

Cranes, forklifts and other such vehicles generally have an audible alarm to indicate that the crane or forklift is travelling with a load. This audible alarm is activated regardless of direction when the crane or forklift is carrying a load. The purpose of the alarm is to warn workers in the vicinity that the crane or other vehicle is carrying a large load and moving. Often the workers tend to disregard the warning since it is not specifically relevant or applicable to particular individuals most of the time. Workers can also become desensitized to audible warnings and/or flashing lights as a result of their constant use, especially when few, if any of the workers are in real danger at any time. In addition to the potential for desensitization, some workers use ear muffs or other such technology that can reduce their chances of being alerted.

Such vehicles may also comprise an audible alarm such as a horn that can be sounded by an operator to warn other individuals that a vehicle is approaching. The horn relies on an operator seeing other individuals. Since the operators are focused on manipulating the loads and driving the vehicles, it is an added pressure on operators to be watchful for other workers.

SUMMARY OF THE INVENTION

Ideally only those workers who are in danger as a result of the moving load passing in their vicinity or overhead should be warned, giving them sufficient time to react or move out of the path, or at least be aware of the potential risk. The present invention seeks to provide a safety system for a load carrying machine to warn people or other individuals of hazards or dangers associated with the machine and/or danger associated with the load being carried by the machine, which will overcome or substantially ameliorate at least some of the deficiencies of the prior art, or to at least provide an alternative.

In accordance of a first aspect of the invention, there is provided a safety system for a load carrying machine comprising:
a controller, a location sensing arrangement in electronic communication with the processor, the location sensing arrangement configured to determine a location parameter of a load,
a monitoring arrangement, the controller configured to receive the location parameter and determine a projected area of the load and control the monitoring arrangement to focus on the projected area to monitor the projected area.

In an embodiment the location sensing arrangement is mounted adjacent a load, or a fixed part of the machine, or a moving part of the machine, or at key reference points outside the machine in the working site.

In an embodiment the location sensing arrangement comprises one or more location sensors, the one or more location sensors configured to sense and provide the location parameter.

In an embodiment the location parameter is a three dimensional coordinate, the three dimensional coordinate relating to a position of the load in three dimensional space.

In an embodiment the one or more location sensors are geo-location sensors, the geo-location sensors configured to communicate with a positioning system to determine the location parameter.

In an embodiment the one or more location sensors are configured to determine the position of the load in three dimensional space relative to the ground or a surface upon which the machine or vehicle is situated.

In an embodiment the location sensing arrangement comprises one or more mounting supports to mount the one or more location sensors adjacent the load or at other positions.

In an embodiment each location sensor is mounted at a unique spot on or adjacent the load, each location sensor configured to provide a unique location parameter, each unique location parameter relating to the position of each spot of the load in three dimensional space.

In an embodiment the controller is configured to determine the projected area based on the location parameter, the projected area relating to an area considered dangerous which is directly under the load or under an anticipated path to be taken by the load.

In an embodiment the controller is configured to calculate the size and shape of the load, the controller using the size and shape information to determine the projected area.

In an embodiment the system comprises a sizing arrangement, the sizing arrangement comprises a plurality of sizing sensors, each sensor being mounted on the extremities of the load, each sizing sensor in electronic communication with the controller, the controller configured receive the output from each sizing sensor and determine the size and shape of the load based on the sensor output.

In an embodiment the system comprises a sizing sensing component, the sizing sensing component measures the size and shape of the load using optical camera, or stereo camera, or depth camera, or 3D camera, or other remote sensing method.

In an embodiment the system comprises a user interface in electronic communication with the controller, the controller is configured to receive size and shape information from a user via a user interface.

In an embodiment the monitoring arrangement comprises one or more monitoring sensors, the one or more monitoring sensors are one or more video recording devices, the one or more video recording devices being movably mounted on the vehicle or machine.

In an embodiment the one or more video recording devices are configured to record the projected area and generate a video stream, the video stream being electronically transmitted to the controller.

In an embodiment the controller is configured to overlay the projected area into the video stream to denote the projected area within the video stream, the video stream with the overlaid projected area being displayed on a user interface such that a user can monitor movement of other people in and out of the projected area.

In an embodiment the controller configured to process the video stream and detect if a worker enters the projected area.

In an alternative embodiment the one or more monitoring sensors is any one or more of: still camera, stereo camera, depth camera, infra-red sensor, 3D camera, audio sensor, laser sensors or motion detectors, wherein the monitoring sensor is configured to monitor the projected area, the monitoring sensor in electronic communication with the controller, the controller configured to receive a monitoring sensor output from the monitoring sensor, the controller configured to process the monitoring sensor output and detect if a worker enters the projected area.

In an embodiment the system comprises an alarm, the controller configured to activate the alarm if a worker enters the projected area.

In an embodiment the system comprises one or more environmental sensors, the one or more environmental sensors configured to detect one or more environmental parameters and transmit the one or more environmental parameters to the controller.

In an embodiment the controller configured to determine the projected area using the one or more environmental parameters in combination with the location parameter.

In an embodiment the controller configured to determine a correction factor based on the one or more environmental parameters, the controller determining a projected area based on the location parameter and the correction factor.

In an embodiment the environmental sensors are any one or more of: an accelerometer, gyroscope, a wind sensor, an anemometer or humidity sensor.

In an embodiment the controller can receive one or more environmental parameters via the user interface, the user interface configured to prompt a user to input one or more environmental parameters.

In an embodiment the monitoring arrangement comprises one or more actuators, the one or more actuators in electronic communication with the controller and mechanically connected to the one or more monitoring sensors, the controller configured to provide an actuation signal to cause movement of the one or more actuators, the actuators being moved to focus the one or more monitoring sensors on the projected area.

In an embodiment the actuation signal comprises an amount of angular adjustment required by the actuator to focus the monitoring sensor on the projected area.

In an alternative embodiment the system comprises a database in electronic communication with the controller, the database configured to store at least a machine model and an environmental model, the controller configured to use the stored machine model, environmental mode and the location parameter to determine the projected area.

In an embodiment the amount of angular adjustment is determined by the controller mathematically using the stored machine model, the machine model comprising vehicle dimensions.

In an embodiment the alarm is any one or more of: an audible alarm, a visual alarm, a tactile alarm, a signal transmitted to a central alarm system, a signal transmitted to a worker device of the worker within the projected area.

In accordance with a second aspect of the invention there is provided a method of controlling a safety system for a load carrying machine comprising steps of:

receiving location parameters of a load and components of the load carrying machine in relation to the working site from a location sensing arrangement, determining a projected area based on the location parameters, controlling a monitoring arrangement to focus on the projected area, providing information to the operator of the load carrying machine on the projected area, activate an alarm if a worker is detected within the projected area.

The term "comprising" (and its grammatical variations) as used herein are used in the inclusive sense of "having" or "including" and not in the sense of "consisting only of". That is, the word does not preclude additional or unrecited elements, substances or method steps, in addition to those specifically recited.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The present invention is related to a safety system for a load carrying machine. In particular the safety system is useful with any load carrying vehicle such as a fork lift, crane, digger, and the like. The present invention can be used with other load carrying machinery such as stationary lifts as found on dockyards or steel plants. The safety system as per the present invention can also be used with any machinery or any vehicles that can present a risk to people at a worksite, such as moving cranes, bulldozers, steam rollers and any other such moveable machinery.

A worksite as described is understood to mean any site where workers or people work closely with load carrying machinery or load carrying vehicles such as a construction site, building sites, ship yards, dockyards, foundries, steel mills, timber mills, manufacturing sites and the like.

In an embodiment the present invention provides safety system for a load carrying machine, the system comprising a controller, a location sensing arrangement in electronic communication with the processor, the location sensing arrangement configured to determine a location parameter of a load, a monitoring arrangement, the controller configured to receive the location parameter and determine a projected area of the load and control the monitoring arrangement to focus on the projected area to monitor the projected area, the controller is further configured to activate an alarm if a worker enters the projected area. The monitoring arrangement is configured to monitor the projected area and provide live images or a video feed to the controller and a signal to the controller if a worker enters the projected area. The projected area is an area on the ground or lower levels or limits of the load movement, which is considered a danger zone due to hazard of falling objects. The projected area normally includes the area directly below the load, and/or may include the area directly below the anticipated movement path of the load. The projected area may be adjusted in accordance to other sensor or user inputs. The projected area is constantly updated based on sensor and/or user inputs. The safety system is particularly useful for use with machines or vehicles that support a load overhead or suspended above ground. The projected area can also relate to an area the load would occupy in a horizontal direction. The projected area generally denotes a danger zone for a worker or other person.

Figure 1:
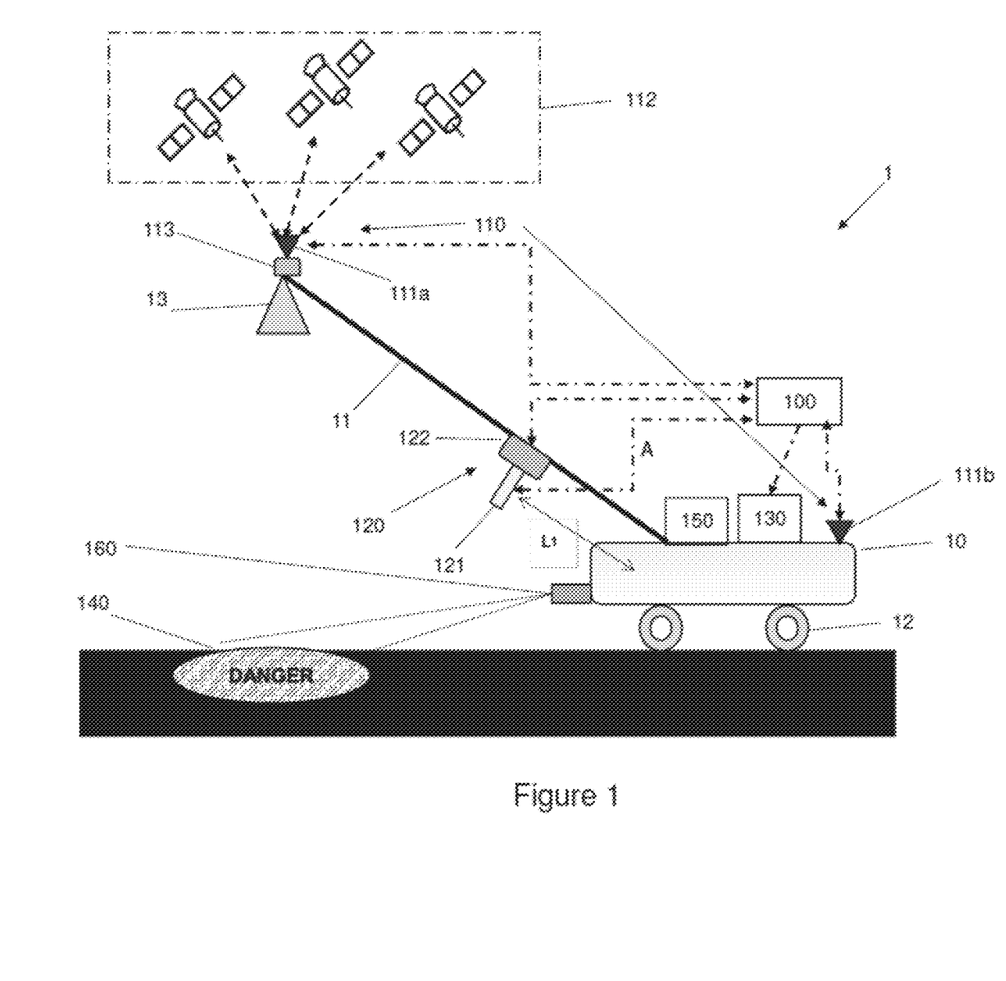
FIG. 1 is a safety system for a load carrying machine in accordance with one embodiment of the present invention.

Referring to FIG. 1 a safety system 1 for a load carrying machine 10. The system comprises a controller 100, a location sensing arrangement 110, a monitoring arrangement 120, a user interface 150 and an alarm 130.

As illustrated in FIG. 1, the load carrying machine is crane with a crane arm or boom 11 and wheels 12. The illustrated embodiment will be described with reference to crane carrying a load 13 overhead. The location sensing arrangement 110, the monitoring arrangement 120 and the alarm 130 are in electronic communication with the controller 100 (as denoted by the dashed arrows in FIG. 1). The location sensing arrangement 110 and monitoring arrangement 120 can send and receive electronic signals from the controller 100. The alarm 130 receives electronic signals from the controller 100, and activates the alarm 130.

The controller 100 is any suitable electronic controller with processing capabilities. The controller 100 is positioned within the cabin of the crane 10. The controller is positioned in any suitable location within the cabin of the crane 10. In alternative embodiments the controller 100 can be a remote to the crane, for example the controller can be positioned at a central location on a work site such as a foreman office. Alternatively the controller can be a computing device that is positioned at a remote location to the work site. Details of the controller will be described later.

The location sensing arrangement 110 comprises multiple components, such as additional sensing components or location sensing arrangements mounted adjacent the load on the crane and/or on key spots on the crane such as on load bearing boom arm of a crane. The controller 100 is configured to receive a location parameter from the location sensing arrangement 110, the controller 100 determines a projected area 140 of the load relative to the ground based on the location parameter. The controller is configured to apply one or more mathematical formulae or any other suitable algorithm to determine the projected area. The controller 100 provides a signal to the monitoring arrangement 120 to focus the monitoring arrangement on the projected area. The monitoring arrangement 120 provides a signal to the controller 100. The controller 100 determines if a worker or another person enters the projected area based on a received location parameter from sensing arrangement 110. The location parameter may be embodied in a signal from monitoring arrangement 120 and optionally other sensing components. Alternatively the location parameter is determined from a signal from the sensing arrangement 110 or other sensing components. The controller 100 is configured to activate the alarm 130 to warn the worker or person that has entered the projected area 140. The controller 100 is further configured to display the projected area to a user through the user interface 150.

The projected area 140 is denoted by the area labelled DANGER in FIG. 1. The projected area 140 is the area on the ground or lower levels of the load movement directly under the load or the anticipated movement path of the load. The projected area include areas that the load may possibly fall to during operation. Any worker being in the projected area is at risk from the potential of a falling load or other objects. In an embodiment, the system 1 can comprise an additional visual device 160 that is configured to exhibit or show the projected area 140 on the ground. The visual display can be a light or a laser that projects a beam covering the projected area to demarcate and illustrate the projected area on the ground. The beam may be a beam of visible light or visible infra-red or visible laser light or any other suitable beam that is visible.

Figure 9:
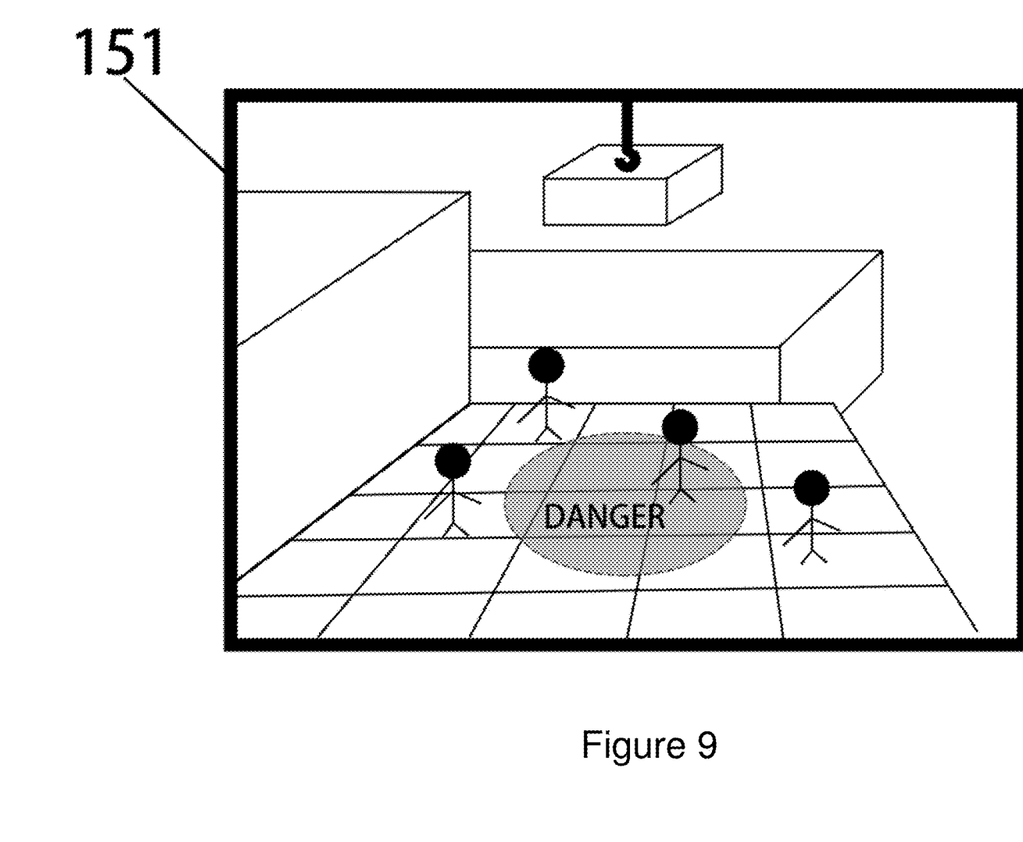
FIG. 9 illustrates a display screen design for showing live video feed of the danger zone with augmented marking of danger zone boundary.

The user interface 150 is a device that allows a user to interact with the interface and interact with the controller. The user interface 150 comprises a screen 151 to display images or video streams. The user interface 150 further comprises a keyboard or a touch screen to allow a user to input information. Any user inputs are communicated to the controller 100 via the interface 150. The user interface 150 is preferably positioned on the machine 10. Alternatively the user interface 150 can positioned at a remote location, such as at a foreman's office. The project area 140 is highlighted on screen 151 for the ease of an operator to visually inspect if any person is currently located on the project area 140. FIG. 9 illustrates one example visual display of screen 151. The screen shows a plurality of people on a worksite with an overhead load. The screen shows one person in the projected area i.e. in the danger zone from the overhead load. Such a situation will trigger alarms and the screen allows an appropriate person such as a machinery operator, or foreman, or safety officer to raise an alarm or take corrective action.

The location sensing arrangement 110 comprises one or more location sensors. The illustrated embodiment of FIG. 1 comprises one location sensor 111a, that is mounted adjacent the load; and one location sensor 111b, that is mounted on the machine. The location sensor 111a can be positioned along a line intersecting the load and perpendicular to the ground. Alternative configurations of the location sensor 111a are also contemplated. For example the location sensor 111a may be positioned on the crane arm, or on the hook of the crane. As a further alternative the location sensor 111a may be mounted temporarily with the load.

The location sensing arrangement 110, in one type of configuration, comprises geo-location sensors that is in communication with a positioning system 112. The location sensing arrangement can comprise any suitable geo-location sensors. One example of a geo-location sensor is a GPS receiver. Alternatively the location sensor is any sensor that can communicate with a satellite positioning system.

The positioning system 112 comprises a plurality of satellites. In one example the positioning system 112 is the GNSS system. The positioning system 112 can be any suitable positioning system such as GPS, BDS, IRNSS, GLONASS and so on.

In another type of configuration, location sensing arrangement 110 comprises local positioning sensors, which has the capability to measure distances between sensors and between sensors and other fixed anchor points installed at known spots in the working site. In such configuration the position of load and specific parts of the machine is recorded in a local site coordinate system or in a local machine based coordinate system. The measurement of distances can be any suitable positioning system as radio frequency transmission based measurement, ultra wide band radio, laser ranging, ultra sound ranging and so on.

The location sensing arrangement 110 is configured to determine a location parameter using the positioning system. The location parameter is a three dimensional coordinate. The location parameter relates to a position of the load in three dimensional space. The location parameter relates to the position of the load since the location sensor 111a is mounted adjacent the load 13. The location sensor 111a determines the position of the load in three dimensional space relative to the ground upon which the crane is situated. The location sensor 111b determines the position of a part of the machine such that the relative position of the monitoring device 120 and the projected area 140 can be deduced. In an alternative embodiment a plurality of more than two location sensors are used to determine the full set of location parameters for the system. They are mounted to various spots of the machine or the work area in accordance to the physical properties and constraints of the machine and the work area.

The location sensing arrangement 110 provides location parameters. Each location parameter comprise of a three dimensional coordinate that includes (x, y, z) information relative to a local or global coordinate system. The location sensing arrangement 110 can determine the location parameter using trilateration or any other suitable algorithm to determine a three dimensional coordinate.

The location sensing arrangement 110 further comprises one or more mounting supports 113. The mounting supports are used to mount the sensor package (i.e. the location sensor 111 and electronics), adjacent the load. The location sensor 111 is mounted on the machine via the mounting supports. In one example the mounting supports are brackets that include a portion to receive the location sensor package. In the illustrated example the location sensor 111 is mounted on the hook of the crane adjacent the load 13. In one example the location sensor 111 is mounted axial with the hook of the crane, such that it is always pointing straight downward to be able to accurately determine the position of the load in three dimensional space. Alternatively the mounting supports are arranged such that the location sensor 111 is positioned substantially perpendicular to the ground to for measuring the position of the load.

In an alternative embodiment the location sensing arrangement 110 may further comprise a calibration device or calibration sensor to calibrate the location sensors 111. The calibration device can comprise a laser, a range finder, ultrasonic device or other suitable device that is used to calibrate the location sensor. The calibration device can also be used a double check to confirm the height determined by the location sensors 111. The calibration device is preferably controlled by the controller 100, but may also be manually operated to allow a user to check accuracy and calibrate the sensors 111. In an alternative embodiment sensors of different type are used to take measurements using different methods, and the results are combined in the controller 100.

Referring to FIG. 1 the monitoring arrangement comprises a monitoring sensor 121 that is mounted to the machine. In the illustrated embodiment of FIG. 1 the monitoring sensor 121 is mounted to the boom 11 of the crane 10. The monitoring sensor 121 is in electronic communication with the controller 100. The monitoring arrangement 120 further comprises an actuator 122. The monitoring sensor 121 is mounted to the crane via the actuator 122. The actuator is connected to the monitoring sensor 121 and also connected to the boom 11 of the crane. The actuator 122 is connected to the crane via any suitable fastener of fastening mechanism. The actuator 122 controls the orientation of the monitoring sensor 121.

The actuator 122 is configured to receive an actuation signal from the controller 100. The actuation signal triggers the actuator to move the monitoring sensor 121. The actuation signal from the controller 100 comprises orientation information. In particular the orientation information includes the amount of angular adjustment required to focus the monitoring sensor 121 onto the projected area 140. The controller 100 determines the amount of angular adjustment using a mathematical formula based on the location parameter returned by sensing arrangement 110, a mathematical model of the machine and other sensors. The amount of angular adjustment can be determined using a machine model (described later). The method of determining angular adjustment will be described later.

As per FIG. 1, the monitoring sensor 121 and the actuator 122 are in electronic communication with the controller 100 (as denoted by the dashed arrows). The controller 100 is configured to determine the target orientation of the monitoring sensor 121 based on the position of the actuator 122. The controller 100 uses the projected area information, location parameter and current orientation of the monitoring sensor 121 to determine the adjustment required to focus on the projected area. The controller 100 provides an actuation signal to the actuator 122 to change the orientation of the monitoring sensor 121 to focus on the projected area. In the illustrated the example of FIG. 1. the actuator 122 is configured to angularly adjust the orientation of the monitoring sensor 121. The actuation signal comprises the amount of angular adjustment required to focus on the projected area 140. The actuator 122 comprises a moving part that translates in receipt of the actuation signal. The translation of the moving part moves the monitoring sensor 121 to focus on the projected area.

The monitoring sensor 121 can be any suitable sensor that is configured to detect the presence of a worker or person within the projected area. In an embodiment the monitoring sensor is a video recording device. The monitoring arrangement 120 may comprise one or more video recording devices. The one or more video recording devices 121 are mounted on a portion of the machine and are configured to focus on the projected area 140. The one or more video recording devices 121 are configured record the projected area and generate a video stream, the video stream is electronically transmitted to the controller 100.

The actuator 122 can be any suitable actuator that can cause a controller movement of the sensor 121. The actuator 122 is such that the controller can control the exact amount of movement required. Some examples of actuators are servo motors, stepper motors, pistons, solenoid valves, cam mechanism, motor activated turntable, pneumatic actuators and the like.

FIG. 1 shows an exemplary, non-limiting embodiment of the invention. FIG. 1 illustrates a video recording device 121 that is mounted on the boom 11. The video recording device 121 is placed at an appropriate distance $L_1$ along the boom 11 of the crane 10. In alternative embodiments the video recording device 121 can be positioned at any distance along the boom 11. The video recording device 121 is a camera e.g. a digital video camera or a thermal camera. The actuator 122 is a servo motor that controls the angular orientation of the video recording device 121 relative to the orientation of the mount.

The video recording device 121 is configured to record the projected area and generate a video stream (A as per FIG. 1). The video stream comprises an image stream of the projected area 140 and the adjacent area. The controller 100 is configured to process the video stream and overlay the projected area 140 onto the video stream. The video stream from the video recording device 121 is displayed to a user on the screen of the user interface 150. The video stream is transmitted and displayed on the screen of the user interface 150 in real time, such that the user views real time video of the projected area 140. A user can monitor the projected area 140 by viewing the video stream on the user interface 150, and activate the alarm if a person or worker is detected in the projected area.

In one example the user interface 150, or at least the screen, is positioned in the cab of the crane 10. The crane driver (i.e. user) can view the video stream in real time with the overlaid projected area 140 on the video stream. As a result if the worker stayed inside or approached the projected area, the crane driver would be made aware and the chance of an accident would be reduced. If a worker is detected inside the projected area the crane driver can also activate the alarm 130, which in this example is an audible alarm such as a horn to warn the worker of the approaching crane and the overhead load 13.

In alternative embodiments the monitoring sensor 121 can be any one or more of infra-red sensors, audio sensors, laser sensors, depth camera, 3D camera or motion detectors. The monitoring sensor 121 can be any suitable sensor that detects the presence of a worker or person in the projected area 140.

Figure 2:
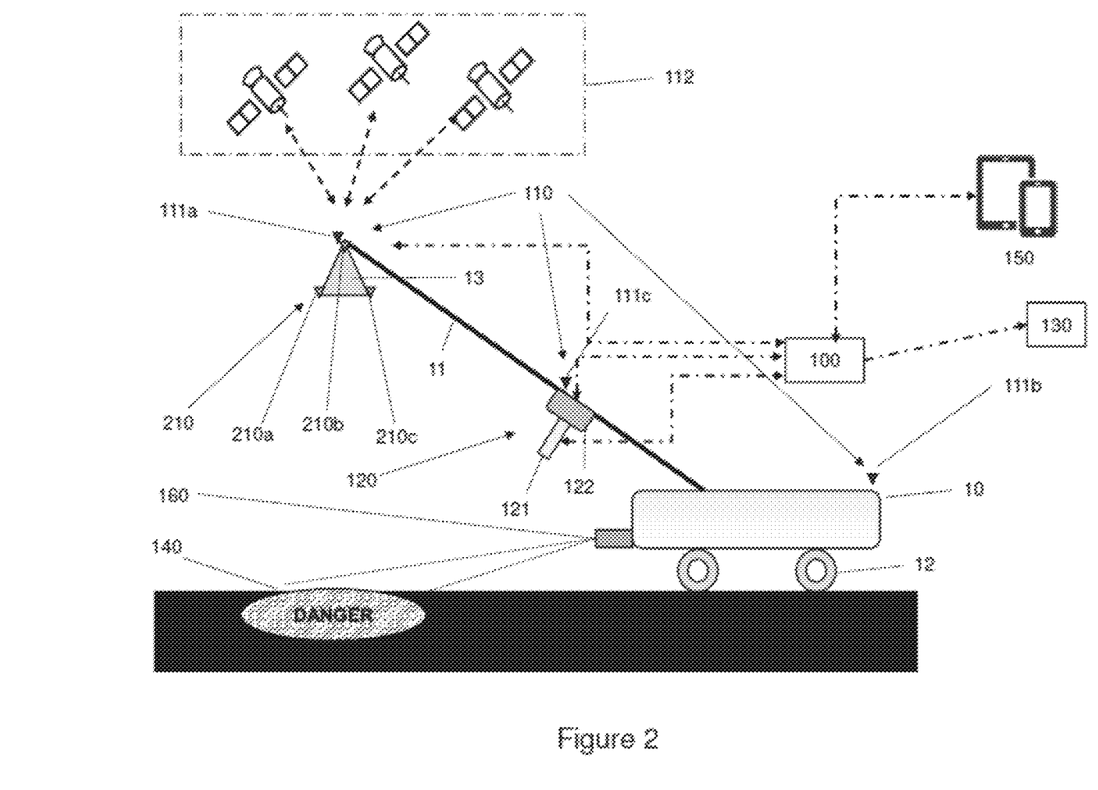
FIG. 2 is a safety system for a load carrying machine comprising a remote user interface and alarm in accordance with an embodiment of the present invention.

FIG. 2 shows another non-limiting exemplary embodiment of a safety system 2 for a load carrying vehicle such as a movable crane or a forklift or digger or any other such load carrying vehicle. The embodiment 2 of the safety system is similar to the embodiment as per FIG. 1. Features common to the embodiments shown in FIG. 1 and FIG. 2 are denoted by the same reference numeral.

The safety system as per FIG. 2 comprises a plurality of location sensors 111a, 111b and 111c. Each location sensor 111a, 111b and 111c are mounted at a unique site on the load or on a unique site on the crane arm adjacent the load 13. Each location sensor 111a, 111b and 111c provides a unique location parameter, wherein each unique location parameter relates to the position of each site of the load in three dimensional space. The controller 100 receives the unique location parameter from each location sensor 111a, 111b and 111c. The controller 100 determines the projected area 140 using the several unique location parameters. The arrangement shown in FIG. 2 provides for a more accurate indication of a projected area as compared to using a single location sensor 111.

The safety system as per the embodiment illustrated in FIG. 2 comprises a sizing arrangement 210. The sizing arrangement 210 is in electronic communication with the controller 100. The sizing arrangement 210 is mounted on the load and outputs a signal to the controller 100. The controller 100 processes the output of the sizing arrangement 210 to determine the size information or outer dimensional bounds of the load 13. The controller uses the size information of the load to determine the size of the projected area 140.

The sizing arrangement 210 comprises a plurality of sizing sensors. In the illustrated example of FIG. 2, the sizing arrangement 210 comprises three sizing sensors 210a, 210b and 210c. The sizing sensors 210a, 210b, 210c are mounted at the extremities of the load. Each sizing sensor is in electronic communication with the controller. Example sizing sensors are laser sensors, radio frequency based rangers, ultra wide band based sensors infra-red sensors, ultrasound rangers or any other suitable sensor. The controller 100 receives and processes the output from each sizing sensor.

The controller 100 determines the size and shape of the load based on the output of the sizing sensors 210a, 210b and 210c. In an alternative embodiment the sizing sensing arrangement 210 measures the size and shape of the load using optical camera, or stereo camera, or depth camera, or 3D camera, or other remote sensing method without requiring attachment of sensors on the load. The controller 100 determines a projected area based on the location parameter from the location sensors 111a, 111b and 111c and the size and shape information from the sizing sensors. This is advantageous because the controller 100 can determine an accurate size and shape of the projected area, since the projected area relates to the size and shape of the load.

The height of the load (i.e. z component) is used to determine the rate of fall if the load were to detach. The controller 100 is configured to account for the time it would take the load to fall from the height it is at. This time to fall is used to determine a projected area.

In one example the projected area is larger, the larger the height. The higher up the load, the greater the risks of damage to a worker from the falling load. Therefore the controller 100 is configured to increase the size of the projected area to be greater than the size and shape of the load 13. A greater projected area 140 than the dimensions of the load 13, ensures any worker or person is not in the vicinity of a falling load.

In an alternative example the projected area is larger, the shorter the height is. This is because the time to react to a falling load is reduced as the load height is reduced, therefore the projected area is increased beyond the actual size of the load. This is to ensure that a worker or person does not walk into the vicinity of the load as there is a reduced time to react in case something goes wrong.

Referring to FIG. 2, the user interface 150 and alarm 130 are remotely positioned. The user interface 150 can be a mobile device such as a smart phone or a tablet. The mobile device can be provided to the crane driver.

The mobile device can also be provided simultaneously to a work site supervisor such as a foreman. The video stream from the monitoring sensor 121 (i.e. the video camera) can be streamed to the mobile user interface. The system can comprise a master user interface that is controlled by work site supervisor such as a foreman. The master user interface can include a plurality video streams from a plurality of load carrying vehicles. This allows a work site supervisor to monitor the safety of a work site. The alarm 130 as per FIG. 2 can also be a remote alarm, e.g. at the office of a work site supervisor or the alarm can be a central alarm.

In an alternative embodiment each person (e.g. worker) on a work site may comprise a personal alarm 130. Each person has an alarm 130 mounted on their hard hat or on their vest. The alarm 130 is configured to provide an alert to a specific worker that enters a projected area. The controller 100 is configured to identify the specific worker within the projected area and transmit an alarm activation signal to the personal alarm 130 of that worker.

Figure 3:
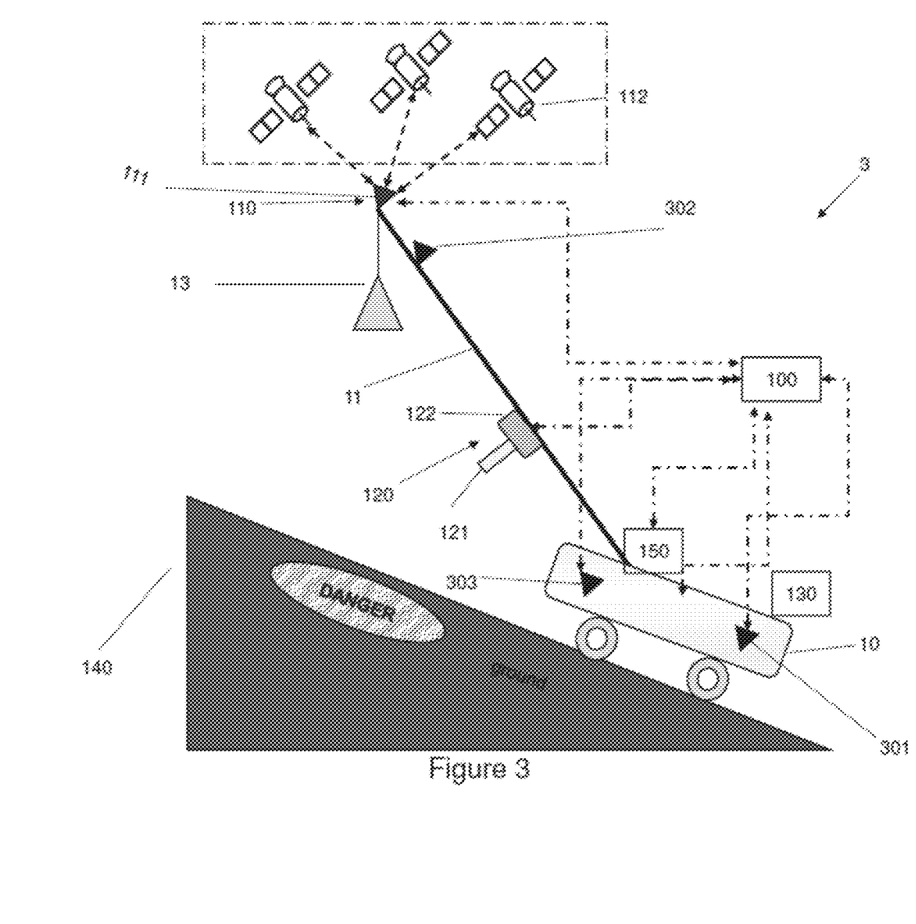
FIG. 3 illustrates an embodiment of a safety system for a load carrying machine comprising one or more environmental sensors to account for environmental differences.

FIG. 3 shows a further embodiment of a safety system for a load carrying machine in accordance with the present invention. The embodiment of the safety system 3 as per FIG. 3 shows a crane 10 on a sloping ground.

As shown in FIG. 3, the safety system 3 comprises one or more environmental sensors 301, 302, 303, the one or more environmental sensors 301, 302, 303 are configured to detect one or more environmental parameters. The environmental sensors 301, 302, 303 are in electronic communication with the controller 100 via wired or wireless connection, similar to the other sensors discussed earlier. The environmental sensors 301, 302, 303 are mounted on the crane 10 body, as shown in FIG. 3.

Alternatively the environmental sensors can be positioned on any part of the crane 10 such as the boom 11 or on the wheels 12 etc. The controller 100 uses the environmental parameters in combination with the location parameters to determine a projected area. The environmental parameters are used by the controller to account for environmental changes or differences.

FIG. 3 shows a moving crane that is positioned on a slope. Referring to FIG. 3, the crane comprises a accelerometer 301. The accelerometer 301 is used to determine the angle of tilt (i.e. the angle of the slope) upon which the crane sits. The crane 10 can comprise an accelerometer 302 that is mounted on the crane body or is alternatively mounted on the crane wheels 12. The accelerometer 302 is used to determine the velocity of the crane 10. A wind sensor 303 can provided on the crane. The wind sensor 303 can be positioned on the body of the crane or more preferably on the boom 11 of the crane. The wind sensor 303 can be for example an anemometer or any other suitable wind sensor. The wind sensor measures the velocity or the direction or the velocity and direction of the wind.

The controller 100 is configured to receive the outputs from any one or more of the environmental sensors 301, 302 and 303 to determine the projected area. For example the controller 100 can adjust the size/location of the projected area 140 to account for the slope of the ground. The location of the projected area 140 can be changed to account for the angle of the slope of the ground. The accelerometer 301 determines the tilt of the ground. The controller 100 uses the tilt information from the accelerometer 301 to determine a corrected projected area 140 to account for the slope of the ground.

In another example the controller 100 can use the wind sensor 303 to determine a projected area 140 that accounts for wind direction and speed. A blowing wind can cause the load 13 to sway and the potential area of danger (i.e. the projected area) is different from the projected area when there is no wind. The controller 100 determines a larger projected area 140 (i.e. a corrected projected area) in high wind conditions to account for the potential for a load swaying and falling at an angle due to the force of gravity and the force of the wind.

In yet another example the controller 100 can adjust the size of the projected area 140 to account for a moving crane 10. The accelerometer 302 determines the speed or acceleration of the crane as the crane moves. The controller 100 determines a corrected projected area 140 to account for the motion of the crane 10. In this example the controller 100 can determine a new projected area every time the controller 100 receives an input from the sensor. The new projected area can be calculated at a rate similar to the sampling rate of the accelerometer 302. The corrected projected area can be larger for a moving crane than for a stationary crane to ensure safety of others on a work site.

In an alternative embodiment the controller 100 can prompt a user to input one or more environmental parameters manually via the user interface 150. For example the user can input the slope or wind speed/direction. The controller 100 is configured to use the manually input environmental parameters and determine a corrected projected area to account for the varying environmental parameters.

Figure 4:
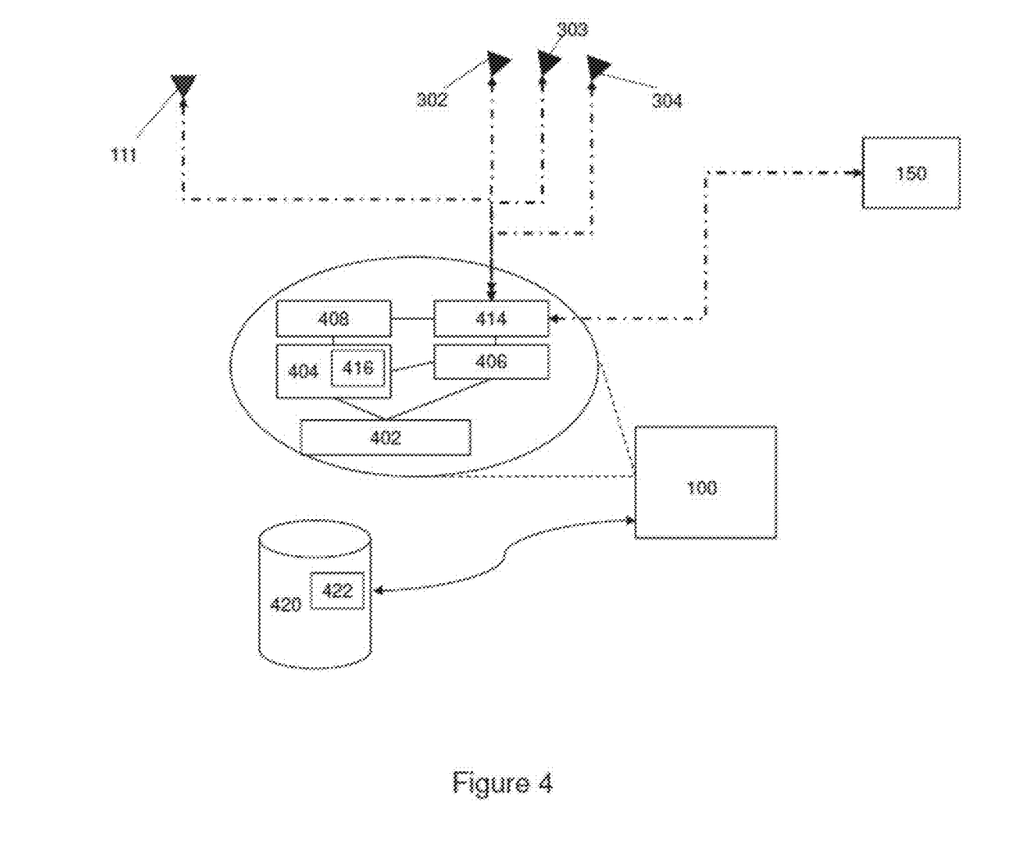
FIG. 4 illustrates a schematic block diagram of the controller used as part of the safety system for a load carrying machine.

FIG. 4 shows a schematic block diagram of the controller 100. The controller 100 is any suitable computing device. The controller 100 comprises suitable components necessary to receive, store and execute appropriate computer instructions. The components may include a processing unit (processor) 402, read only memory (ROM) 404, random access memory (RAM) 406. The controller 100 can also include disk drives 408, input devices 410 such as an Ethernet port or a USB port etc. The controller 100 includes instructions that may be included in ROM 404, RAM 406 or disk drives 408 and may be executed by the processor 402. There may be provided a plurality of communication links 414 which may variously connect to one or more computing devices such as a server, personal computers, terminals, wireless or handheld computing devices, mobile devices, tablets or smartphones. The communication links 414 are used to connect to and communicate with various sensors (as earlier described) or with a user interface 150. At least one of the plurality of communications link may be connected to an external computing network through a telephone line or other type of communications link. The sensors can be connected to the controller via wired connections, but preferably the sensors are connected via the communications link or any other suitable wireless communication interface. The sensors communicate with the controller 100 and in particular the processor 402 using any suitable wireless communication protocol like Bluetooth, Wi-Fi, infra-red and so on.

The disk drives 108 may encompass solid state drives or hard disk drives. The controller 100 may use a single disk drive or multiple disk drives. The controller 100 may also have a suitable operating system 416 which resides on the disk drive or in the ROM of the controller 100.

The controller 100 can also comprise a database 420 residing on a disk or other storage device. Alternatively the database 420 may be remote to the controller 100, such that the controller can wirelessly communicate with the database 420. The database 420 is arranged to store at least one record 422 on the database.

In an embodiment the database 420 is configured to store at least a machine model 430. The machine model 430 includes a plurality of machine parameters. The machine parameters can be one or more key dimensions of the machine. In the illustrated example the machine model is the model of a crane. The controller 100 utilises the machine model to determine a more accurate projected area. In an alternative embodiment the database 420 can be configured to store a plurality of machine models for different types of machines that can use the safety system, for example a forklift, bulldozer, a digger or any other such machine that can carry a load. In an embodiment the controller 100 can allow a user or system operator to select the type of machine that is being used. The controller 150 uses the selected machine to determine a more accurate projected area.

Figure 5:
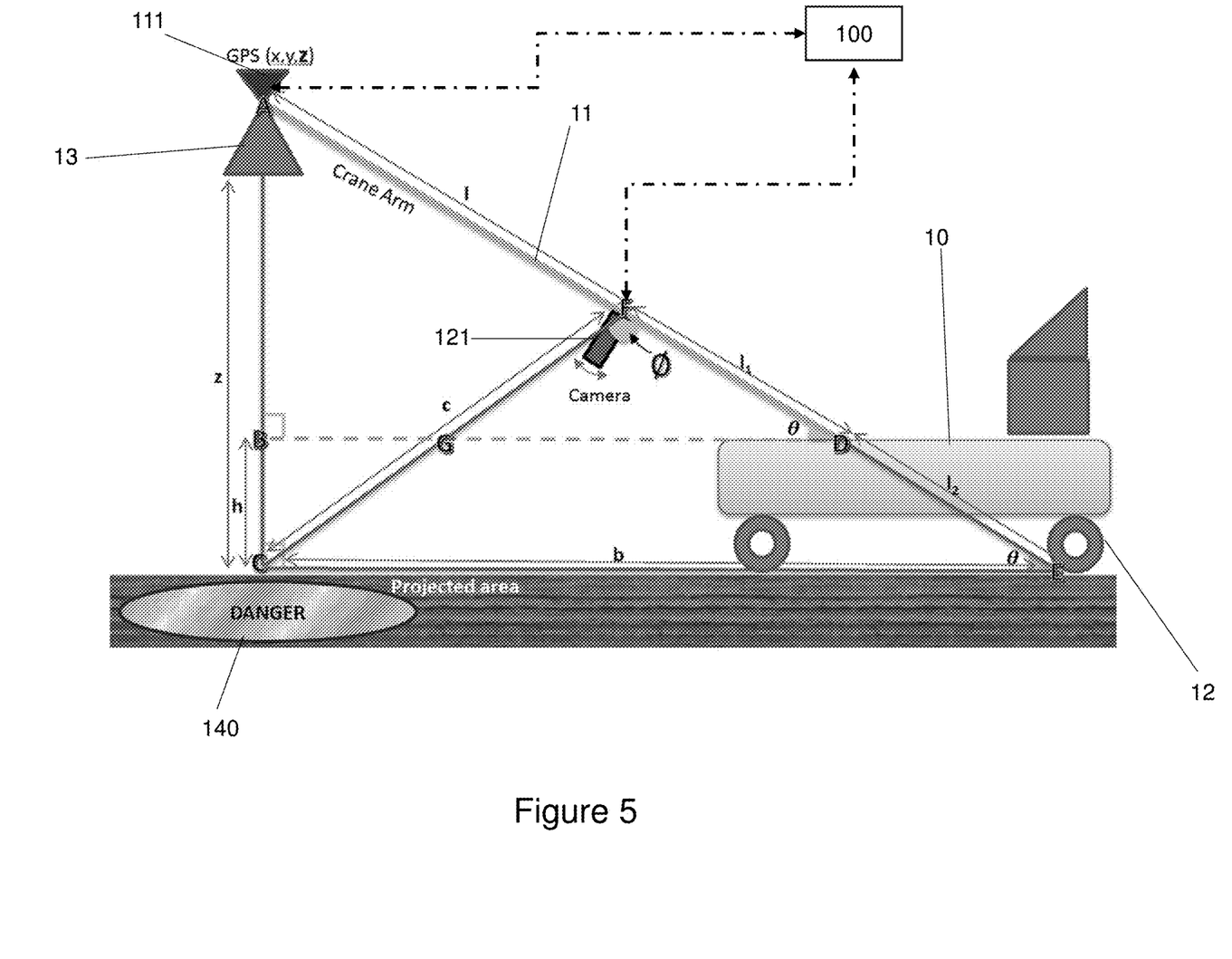
FIG. 5 is diagram illustrating of how the controller uses the machine model to determine the amount of angular adjustment required to focus the monitoring sensor onto the projected area.

The controller 100 further uses a machine model 422 or machine dimensions to determine the amount of angular adjustment required to focus the monitoring sensor 121 on the projected area. FIG. 5 is diagram illustrating of how the controller uses the machine model to determine the amount of angular adjustment required to focus the monitoring sensor 121 onto the projected area.

In a further embodiment the database 420 can store one or more load models. The load model comprises dimensions of a load. The controller 100 can determine the projected area using the load dimensions and the location parameter that is determined from a location sensor (as described earlier). In this embodiment the user can be prompted to input the type of load being lifted via the user interface 150. The processor 402 receives the input and selects the load model that relates to the load inputted by the user. The user can be presented a list of predetermined/pre-stored load models to select from. Alternatively the user can be prompted to input dimensions of the load. The controller 100 uses the load model and location parameter to determine an accurate projected area that corresponds to the area the load would occupy on the ground.

In a further embodiment the controller can comprise a manual override switch (not illustrated). The override switch allows a user to override any function of the controller 100 in case of emergency or faults.

In a further alternative embodiment the controller 100 can comprise a fault diagnosis module (not illustrated). The fault diagnosis module is configured to identify and address any errors of faults that may occur. The fault diagnosis module is configured to provide an instruction to the user of any faults through the user interface. The fault diagnosis module can automatically run a fault check at regular intervals.

FIG. 5 shows a diagram of a machine model with the critical dimensions of the crane. The angular adjustment of the monitoring sensor 121 is determined using the critical dimensions. In the embodiment of FIG. 5, the monitoring sensor 121 is a camera, as indicated in FIG. 5. The embodiment of FIG. 5 further comprises a location sensor 111. The projected area 140 is determined as described earlier. The method of determining the desired viewing angle $\theta$ will be described with respect to FIG. 5 and the dimensions of the crane.

The controller 100 is configured to determine the initial position of the camera 121 relative to the projected area, wherein the projected area is determined using the location sensor 111. Referring to FIG. 5:

| | |
|---|---|
| $\frac{z-h}{l+l_1} = \frac{z}{l+l_1+l_2} \rightarrow l+l_1+l_2 = \frac{(l+l_1)z}{z-h}$ | Similar Triangle ($\triangle ABD \sim \triangle AC$) |
| $b = \sqrt{(l+l_1+l_2)^2 - z^2}$ | Pyth. Theorem ($\triangle ACE$) |
| $c = \sqrt{(l_1+l_2)^2 + b^2 - 2(l_1+l_2)b \cos \theta}$ | Cosine Formula ($\triangle FCE$) |
| $\frac{\sin \emptyset}{b} = \frac{\sin \theta}{c} \rightarrow \sin \emptyset = \frac{b \times \sin \theta}{c} \rightarrow \emptyset = \sin^{-1}\left(\frac{b \times \sin \theta}{c}\right)$ | Sine Rule ($\triangle FCE$) |

The angle $\theta$ is determined using trigonometry, as disclosed above. The controller 100 is configured to turn the camera 121 to this angle. The above explained mathematics is processed by the processor 402. The ROM or disk drives comprise a set of executable instructions. The processor 402 executes the mathematics to determine the target viewing angle and instruct the actuating mechanism to execute the action until the desired viewing angle is met.

The mathematics required to determine the amount of angular adjustment can be included as part of the machine model. In an alternative embodiment, the monitoring arrangement 120 allows for more than one degree of freedom. In this arrangement multiple actuation parameters will be determined by the mathematical formula. In yet another alternative embodiment, the monitoring arrangement 120 comprise multiple monitoring components each installed in a different location of the machine or in selected spots in the working site. These components works in parallel or are automatically selected by the controller to cover all possible interested areas for the operation of the machine. In this embodiment the selection of monitoring component to focus on is also the result of the calculation based on the mathematical formula based on the machine model and may optionally include arrangement of the site.

Figure 6:
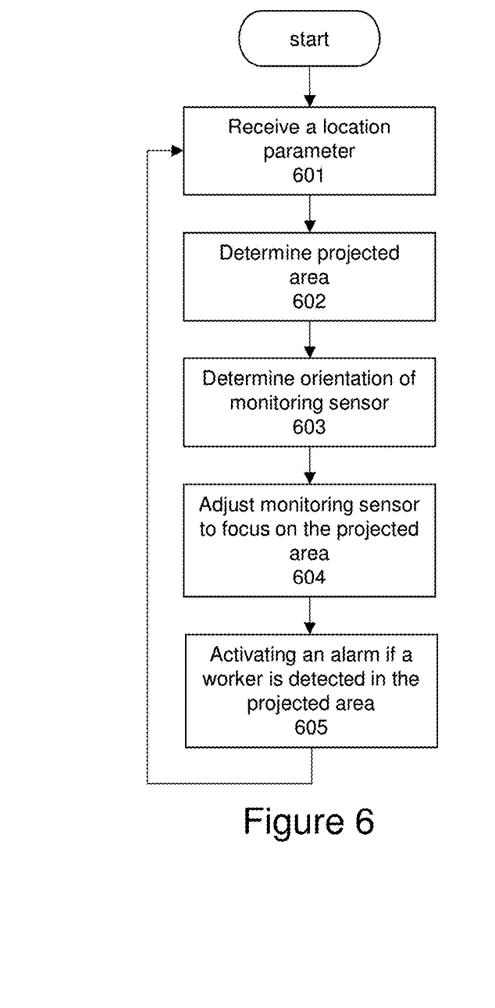
FIG. 6 shows a flow diagram of a method of controlling a safety system for a load carrying machine; and, FIG. 7 shows a further embodiment of a method of controlling a safety system for a load carrying machine.

FIG. 6 illustrates a method 600 of controlling a safety system for a load carrying machine. Referring to FIG. 6, the method comprises the steps of receiving a location parameter of a load at step 601. The location parameter is received from a location sensing arrangement. Step 602 comprises determining a projected area based on the location parameter of the load. Step 603 comprises determining one or more monitoring components and the desired viewing angles of the monitoring sensors. Step 604 comprises adjusting the monitoring sensor position to focus on the projected area. At step 605, the method comprises activating an alarm if a worker is detected in the projected area by the monitoring arrangement. The desired viewing orientation of the monitoring sensor is determined using mathematical formulae such as trigonometry to determine the amount of angular adjustment of the monitoring sensor to focus on the projected area.

Figure 7:
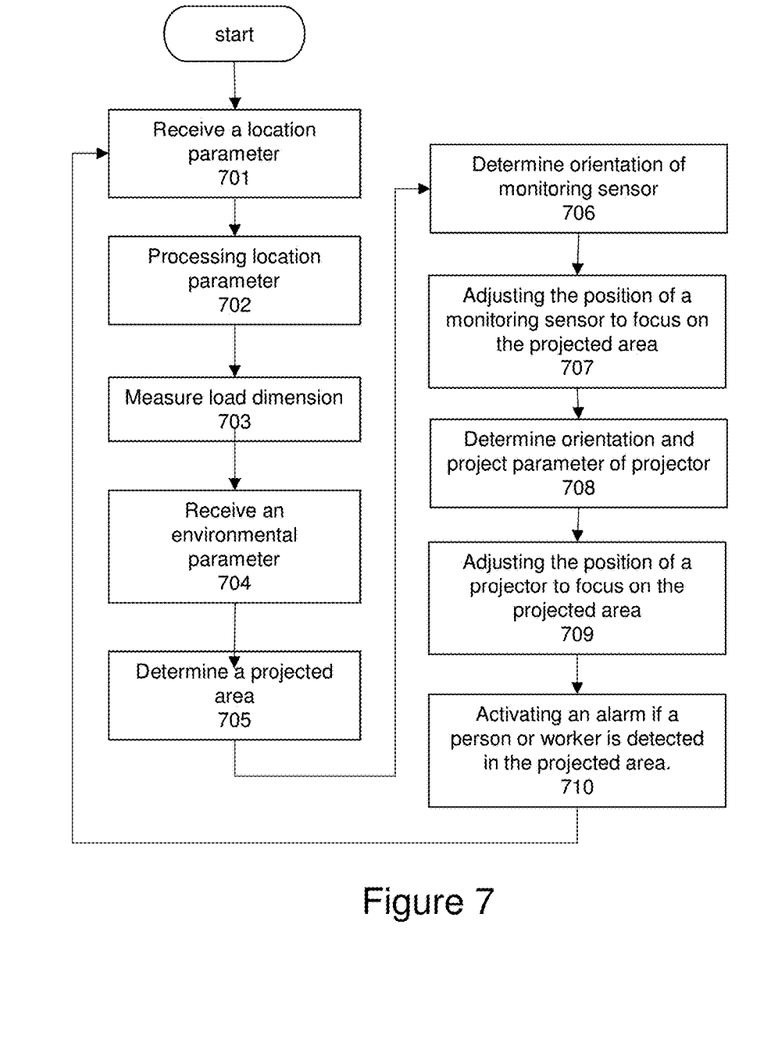

FIG. 7 shows a further embodiment of a method 700 of controlling a safety system for a load carrying machine. Referring to FIG. 7, step 701 comprises receiving a location parameter of a load. Step 702 comprises processing a location parameter. Step 703 comprises receiving a load measurement that comprises load dimensions. Step 704 comprises receiving at least one environmental parameter from an environmental sensor. At step 705 a projected area is determined using the location parameter, at least one or more of the environmental parameter, load dimension and a preinstalled machine model. Step 706 comprises selecting one or more monitoring components and determining the desired viewing orientation of the monitoring sensors to focus on the projected area. Step 707 comprises adjusting the orientations of the monitoring sensors to focus on the projected area. Step 708 comprises selecting one projector component of visual device 160 and determining its orientation and projection Step 709 comprises adjusting the orientation of the projector and adjusting the projection parameters to accurately display danger zone warning. Step 710 comprises activating an alarm if a person or worker is detected within the projected area by the monitoring sensor.

Figure 8:
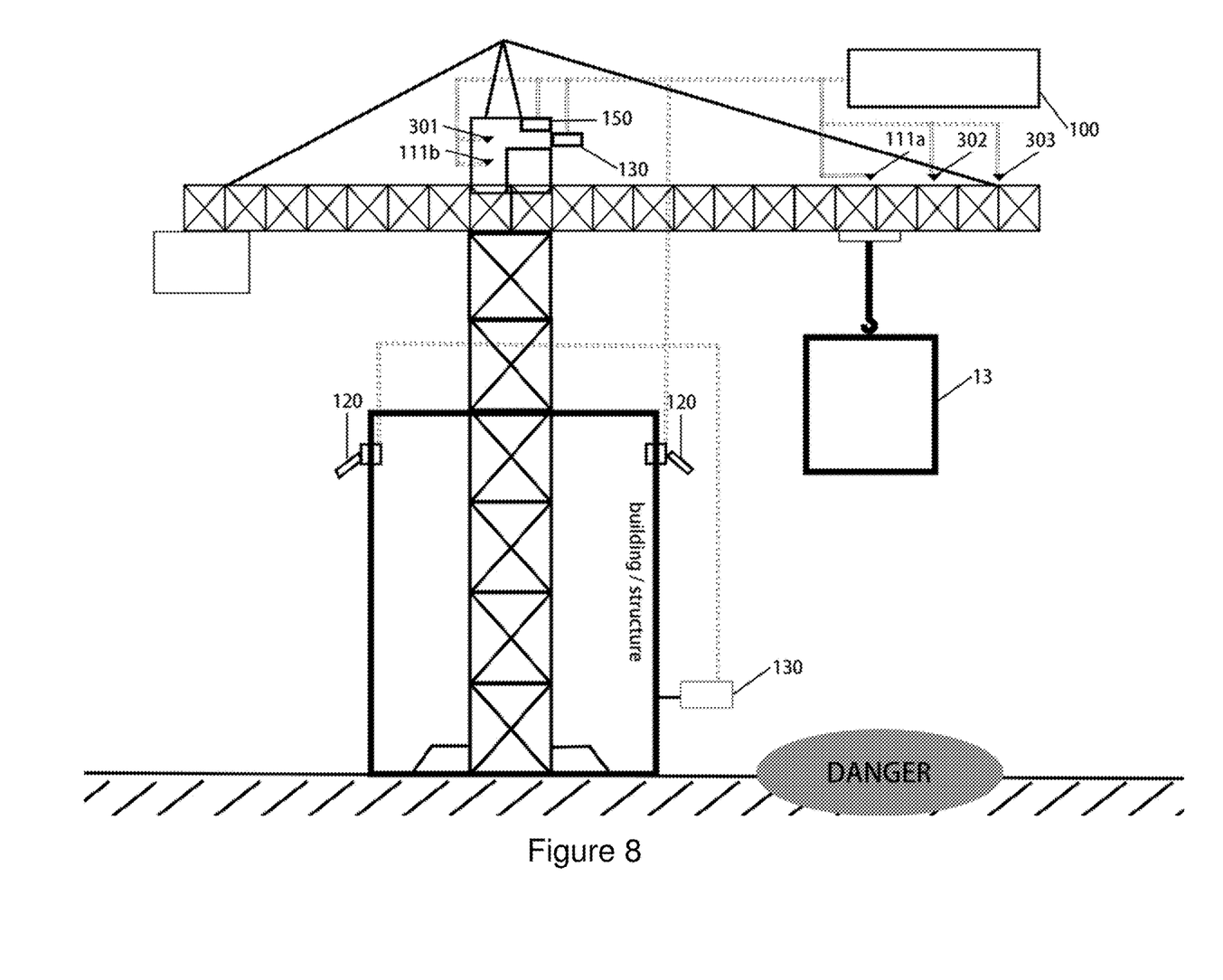
FIG. 8 is a safety system for a load carrying machine in an arrangement in which multiple monitoring components are installed to different spots.

FIG. 8 shows a further embodiment of a safety system that serves multiple loading and unloading areas which are not viewable from equipment mounting on the machine. FIG. 8 shows a crane with a boom arm that carries a load 13. The safety system is used in conjunction with the crane or any other such machine such as container loading cranes at a port or other fixed load carrying machines. The crane boom arm comprises a pair of location sensors 111a and 111b. The location sensor 111a is mounted on the crane arm adjacent the load 13. The location sensor 111a is a fixed location sensor and may be mounted on or adjacent the hook or a runner that moves along the boom arm and carries the hook. Alternatively the location sensor 111a may be fixedly attached to the boom arm of the crane. The location sensor 111b is attached to the fixed part of the machine, i.e. the support pillar. The location sensors 111a and 111b are configured to determine the position of the load 13 relative to the ground in three dimensions.

The crane further comprises one or more environmental sensors. In the illustrated embodiment of FIG. 8, the crane includes three environmental sensors 301, 302 and 303. A first environmental sensor 301 is mounted adjacent or on the stationary part of the crane i.e. the support pillar. The second environmental sensor 302 and the third environmental sensor 303 are arranged on the boom arm adjacent the load 13. The environmental sensors are configured to detect one or more environmental parameters that can affect the load, such as tilt angle of the ground, wind speed, humidity, wind direction, rotation of the boom arm and the like. The environmental sensor 301, 302 and 303 can be any suitable sensor such as wind speed sensor, barometer, thermometer, accelerometer, gyroscope and so on.

The controller 100 is configured to receive the inputs from the location sensors and/or the environmental sensor and determine the projected area based on the sensor outputs. The controller 100 is configured to use a similar processing scheme as described earlier. The controller 100 uses the location information (i.e. location parameters) from the location sensors 111*a* and 111*b* in addition with the environment information from the environmental sensors 301, 302, 303 to determine a projected area. The controller 100 is configured to determine the position of the monitoring arrangement 120 and control the monitoring arrangement 120 such that the monitoring arrangement focusses on the projected area marked as DANGER. The monitoring arrangement may be a video camera or any other suitable monitoring apparatus as described earlier.

In this embodiment, monitoring arrangement 120 comprise of multiple components installed at spots of the working site by which an aggregation of all potential danger zones are covered and monitored. The illustrated example shows two monitoring arrangements e.g. two cameras mounted on opposing sides of the base building or structure. Each monitoring arrangement is configured to monitor each side of the crane and detect if a person enters the projected area. In an alternative embodiment, visual device 160 (not illustrated) may also comprise of multiple components by which an aggregation all potential danger zones are covered. Depending on the location parameters, controller 100 sends movement commands to selected components of monitoring arrangement 120 and if applicable, selected components of visual device 160, to an position and orientation that points to the current danger zone.

The system of FIG. 8 comprises a user interface 150 positioned on or within the operator cab. The user interface 150 may be a screen and displays a video feed from the monitoring arrangement 120. The system further includes multiple alarms 130. One alarm is positioned in the operator cab and one alarm is positioned on ground level. The operator cab alarm is configured to provide an alarm (audio or visual or a combination thereof) to the crane operator if a person is detected in the projected area (i.e. the danger zone) by the monitoring arrangement. The ground level alarm 130 is attached to the building or base structure of the crane and is configured to activate if based on an activation signal from the controller 100. The activation signal is generated if a person is detected within the projected area or danger zone by the monitoring arrangement 120. The ground level alarm 130 alerts persons on ground level if they enter the projected area.

The foregoing describes only exemplary embodiments of the present invention and modifications, obvious to those skilled in the art, can be made thereto without departing from the scope of the present invention. It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

While the invention has been described with reference to a number of preferred embodiments it should be appreciated that the invention can be embodied in many other forms.

The invention claimed is:

1. A safety system for a load carrying machine or vehicle, the safety system comprising:
   a controller;
   a location sensing arrangement in electronic communication with the controller and configured to determine a location parameter of a load carried by the machine or vehicle;
   a monitoring arrangement having:
      one or more monitoring sensors in electronic communication with the controller, and
      one or more actuators in electronic communication with the controller and mechanically connected to the one or more monitoring sensors to control orientation of the one or more monitoring sensors; and
   a visual device provided on the machine or vehicle, in electronic communication with the controller, comprising a projector with an adjustable orientation arranged to provide a visible beam;
   wherein the controller is configured to:
      receive the determined location parameter;
      determine, based at least on a machine model with one or more dimensions of the machine or vehicle and the determined location parameter, a projected area of the load relating to an area considered dangerous, which is under an anticipated path to be taken by the load;
      adjust, based on the determined projected area, (i) the one or more monitoring sensors to focus on the determined projected area to monitor the determined projected area; and (ii) the orientation of the projector so as to move the visible beam to illustrate the determined projected area.

2. The safety system in accordance with claim 1, wherein the location sensing arrangement is mounted:
   adjacent a load,
   at a fixed part of the machine or vehicle,
   at key reference points outside the machine or vehicle, or
   at a moving part of the machine or vehicle.

3. The safety system in accordance with claim 1, wherein the location sensing arrangement comprises one or more location sensors configured to determine the location parameter.

4. The safety system in accordance with claim 1, wherein the determined location parameter is a three dimensional coordinate of a position of the load in three dimensional space.

5. The safety system in accordance with claim 3, wherein the one or more location sensors are geo-location sensors configured to communicate with a positioning system to determine the location parameter.

6. The safety system in accordance with claim 3, wherein the one or more location sensors are configured to determine a position of the load in three dimensional space relative to a ground or a surface upon which the machine or vehicle is situated.

7. The safety system in accordance with claim 3, wherein the location sensing arrangement comprises one or more mounting supports for mounting the one or more location sensors adjacent the load.

8. The safety system in accordance with claim 3, wherein each of the one or more location sensors is mounted at a unique spot on or adjacent the load and is configured to provide a unique location parameter relating to respective position of the respective spot in three dimensional space.

9. The safety system in accordance with claim 1, wherein the controller is configured to calculate size and shape of the load, and to use the calculated size and shape to determine the projected area.

10. The safety system in accordance with claim 1, further comprising a sizing arrangement having a plurality of sizing sensors each mounted on a respective extremities of the load, each of the sizing sensors is in electronic communication with the controller, and the controller is configured to receive output from each of the sizing sensors and to determine the size and shape of the load based on the outputs from the sizing sensors.

11. The safety system in accordance with claim 1, further comprising a user interface in electronic communication with the controller, the controller is configured to receive, via a user interface, size and shape information of the load from a user, and use the received size and shape information to determine the projected area.

12. The safety system in accordance with claim 1, wherein the one or more monitoring sensors are one or more video recording devices movably mounted on the machine or vehicle.

13. The safety system in accordance with claim 12, wherein the one or more video recording devices are configured to record the determined projected area and generate a video stream for electronic transmission to the controller.

14. The safety system in accordance with claim 13, wherein the controller is configured to overlay the determined projected area into the video stream to denote the determined projected area within the video stream, the video stream with the overlaid projected area is arranged to be displayed on a user interface such that a user can monitor movement of other people in and out of the determined projected area.

15. The safety system in accordance with claim 13, wherein the controller is configured to process the video stream and to detect if a worker enters the determined projected area.

16. The safety system in accordance with claim 1, wherein the one or more monitoring sensors comprises one or more of: still camera, stereo camera, depth camera, and 3D camera, wherein the one or more monitoring sensors are configured to monitor the determined projected area, the controller is configured to receive respective monitoring sensor output from the one or more monitoring sensors and to process the respective monitoring sensor output and detect if a worker enters the determined projected area.

17. The safety system in accordance with claim 1, further comprising an alarm, the controller is configured to activate the alarm if a worker enters the determined projected area.

18. The safety system in accordance with claim 1, further comprising one or more environmental sensors configured to detect one or more environmental parameters and to transmit the one or more environmental parameters to the controller.

19. The safety system in accordance with claim 18, wherein the controller is configured to determine the projected area using the one or more environmental parameters in combination with the location parameter.

20. The safety system in accordance with claim 18, wherein the controller is configured to determine a correction factor based on the one or more environmental parameters and to determine a projected area based further on the correction factor.

21. The safety system in accordance with claim 18, wherein the one or more environmental sensors comprises one or more of: an accelerometer, gyroscope, a wind sensor, an anemometer, and a humidity sensor.

22. The safety system in accordance with claim 18, wherein the controller can receive one or more environmental parameters via a user interface, the user interface is configured to prompt a user to input one or more environmental parameters.

23. The safety system in accordance with claim 1, further comprising a database in electronic communication with the controller, the database is configured to store at least the machine model and an environmental model, and the controller is configured to use the machine model, the stored environmental model, and the determined location parameter to determine the projected area.

24. The safety system in accordance with claim 23, wherein the amount of angular adjustment is determined by the controller mathematically using the machine model with one or more dimensions of the machine or vehicle.

25. The safety system in accordance with claim 17, wherein the alarm is any one or more of: an audible alarm, a visual alarm, a tactile alarm, a signal transmitted to a central alarm system, and a signal transmitted to a worker device of a worker within the determined projected area.

26. The safety system in accordance with claim 1, further comprising a sizing sensing component for measuring the size and shape of the load using an optical camera, stereo camera, depth camera, or 3D camera.

27. A method of controlling a safety system for a load carrying machine or vehicle, the method comprising steps of:
determining, using a location sensing arrangement, a location parameter of a load carried by the load carrying machine or vehicle;
receiving, at a controller, the determined location parameter;
determining, at the controller, based at least on a machine model with one or more dimensions of the load carrying machine or vehicle and the determined location parameter, a projected area of the load relating to an area considered dangerous, which is under an anticipated path to be taken by the load; and
adjusting, based on the determined projected area, (i) one or more monitoring sensors to focus on the projected area to monitor the determined projected area; and (ii) the orientation of a projector of the visual device so as to move a visible beam to illustrate the determined projected area.

* * * * *